United States Patent [19]

Myers et al.

[11] Patent Number: 5,629,789
[45] Date of Patent: May 13, 1997

[54] PASSIVE OPTICAL REPEATER BYPASS FOR OPTICAL FIBER SYSTEMS

[75] Inventors: John H. Myers, Jersey City; Carmine J. Pagano, II, Summit; Richard J. Ramsay, Somerville, all of N.J.

[73] Assignee: Lucent Technologies Inc., Murray Hill, N.J.

[21] Appl. No.: 547,917

[22] Filed: Oct. 25, 1995

Related U.S. Application Data

[63] Continuation of Ser. No. 236,059, May 2, 1994, abandoned.
[51] Int. Cl.$^6$ ............................................... H04B 10/02
[52] U.S. Cl. ............................................. 359/177; 359/158
[58] Field of Search ............................. 359/174–177, 359/179, 158

[56] References Cited

U.S. PATENT DOCUMENTS

| | | | |
|---|---|---|---|
| 4,166,946 | 9/1979 | Chown et al. | 455/601 |
| 4,435,849 | 3/1984 | Ilgner et al. | 455/601 |
| 4,932,038 | 6/1990 | Windus | 359/176 |
| 5,023,942 | 6/1991 | Goepel | 359/174 |
| 5,097,353 | 3/1992 | Fujiwara et al. | 359/177 |
| 5,274,496 | 12/1993 | Fujiwara et al. | 359/177 |
| 5,293,260 | 3/1994 | Kikawa et al. | 359/177 |
| 5,349,463 | 9/1994 | Hirohashi et al. | 359/174 |
| 5,369,520 | 11/1994 | Avramopoulos et al. | 359/176 |

FOREIGN PATENT DOCUMENTS

| 2192235 | 7/1990 | Japan | 359/174 |
|---|---|---|---|

OTHER PUBLICATIONS

Repeaters for Optical Communications Systems Author: Electrical Communication vol. 52, No. 3 (1977) Chown, M.

*Primary Examiner*—Leslie Pascal
*Attorney, Agent, or Firm*—Charles E. Graves; Martin I. Finston

[57] ABSTRACT

A passive fiber optic repeater bypass is provided which brings fault tolerance to repeatered fiber optic transmission systems. A fiber optic bypass provides an alternate signal path around failed repeaters. The bypass optical attenuation is set to ensure the bypass signal is sufficiently small so as not to interfere with the locally regenerated and transmitted signal, but sufficiently large to be received at the next repeater. In the event of a repeater failure, a repeater monitor disables the local laser transmitter allowing the bypass signal to be received at the next repeater.

4 Claims, 2 Drawing Sheets

PASSIVE OPTICAL REPEATER BYPASS FOR OPTICAL FIBER SYSTEMS

This application is a continuation of application Ser. No. 08/236059, filed on May 2, 1994, now abandoned.

FIELD OF THE INVENTION

This invention relates to optical communications systems and more specifically to repeatered remote powered systems.

BACKGROUND OF THE INVENTION

In certain optical transmission systems which require a relatively large number of serially-connected optical repeaters, each repeater constitutes a potential point of failure for the entire system. A common approach to safeguarding against system failure due to failure of a single repeater is to use ultra-high reliability components. These can be extremely costly, however, and by themselves do not provide for a failure-mode recovery.

Some digital optical transmission systems, such as underwater surveillance systems, have relatively close repeater spacing as compared to long-haul systems where as few repeaters as possible are used. With close repeater spacing, there often is ample optical signal strength entering each successive repeater to add an optical repeater bypass path around each repeater to provide some tolerance to repeater fault.

While repeater bypasses are generally known in the art, it is not always easy to implement a bypass. One problem is that the bypass signal output must not interfere with the next-in-line digital repeater's ability to accurately lock onto and amplify the bit stream. At the same time, the bypass signal output must be great enough that the next-repeater can detect the bit stream to be amplified. A further problem relates to detecting what type of malfunction has occurred, and whether it necessitates the shutting down of the local repeater.

SUMMARY OF THE INVENTION

The invention provides a bypass signal having a strength relative to the recovered and locally amplified signal which is held to within a certain range. The range at one extreme is set on the susceptibility of the next-repeater to degradation from a strong, out-of-phase bit stream replica of the system signal; and at the other extreme on the sensitivity of the next toward-shore repeater to low level bypass signals in the absence of an amplified system signal from the faulted repeater. Settings of a splitter in combination with, optionally, setting of a bypass loop attenuator, provide the requisite relative signal strength.

The invention also involves detecting several operating conditions in a repeater monitor unit, and selectively disabling the local repeater in response to detecting one or more of the conditions.

DETAILED DESCRIPTION OF AN ILLUSTRATIVE EMBODIMENT

Figure 1:
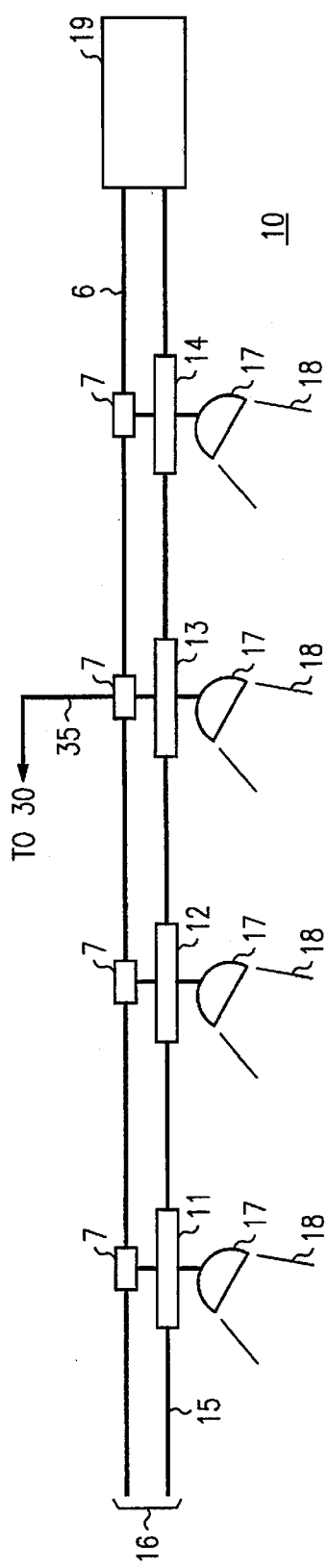
FIG. 1 is a diagram of a typical ocean surveillance system served by the invention.

Referring to FIG. 1, there is shown an exemplary surveillance system 10 consisting of repeaters 11, 12, 13, 14, connected serially in a system optical fiber 15. It is understood that the system 10 may have multiple further repeaters in its outward-bound path denoted 16. Each repeater includes a sensor 17 designed to detect, for example, acoustic energy present within the beam 18 of its sensor element. The system connects to an information collection facility 19 which may be located on shore, on an undersea platform, or on-board a vessel. While the invention is illustrated through a surveillance system, it is also applicable to optical fiber telecommunications systems.

Repeaters 11–14 and others not shown are powered by power circuit 6 provided from facility 19 which includes power drops 7 to each repeater which supply +5 volts to operate the electronics in each repeater.

Figure 2:
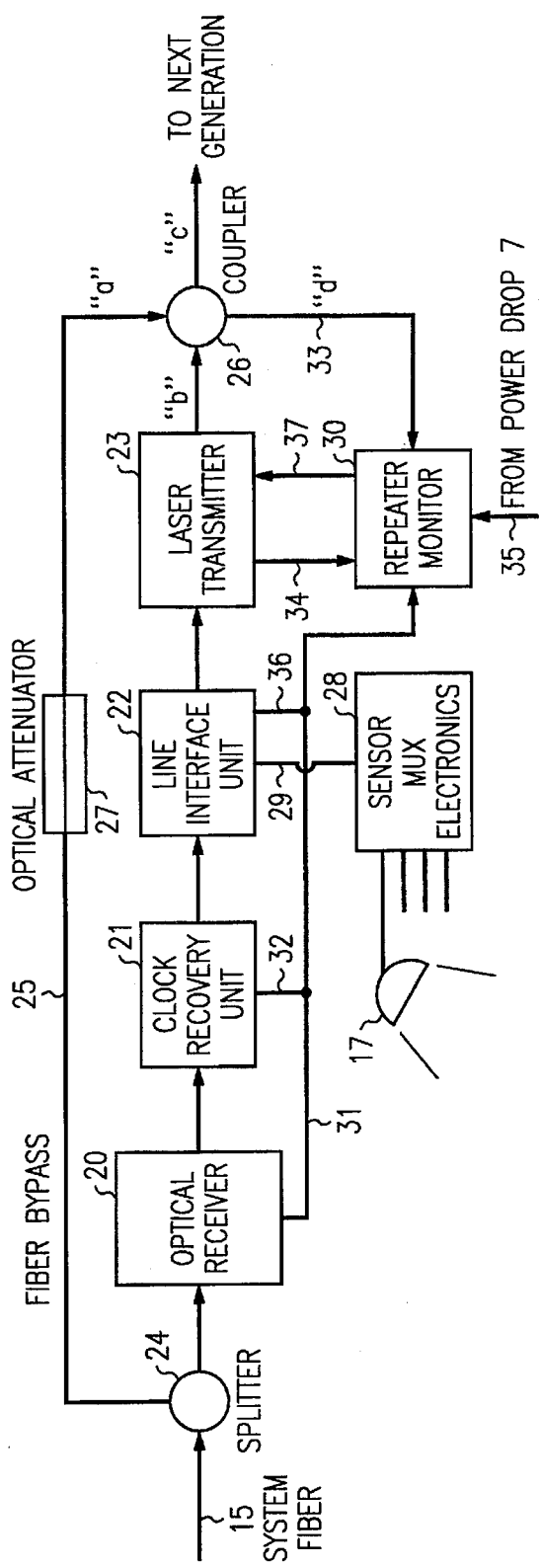
FIG. 2 is a schematic block diagram of an optical repeater disposed in such a system, with bypass and control elements.

Referring to FIG. 2, each repeater such as repeaters 11–14 consists of an optical receiver 20, a clock recovery 21, a line interface unit 22, and a laser transmitter 23. Receiver 20 converts the digital incoming optical data stream to an electrical signal and amplifies it to a level suitable for inputting to clock recovery 21. Clock recovery 21 conventionally recovers the clock pulse from the incoming data stream and employs it to re-time the digital data which removes timing jitter. Line interface unit 22 synchronously multiplexes the sensor data acquired by local sensor 17 onto the data stream of the system fiber 15.

Laser transmitter 23 operates in a band of from about 1.3 µm to about 1.55 µm, the precise wavelength being unimportant to the invention. Laser transmitter 23 typically has a fixed output power level sufficient to assure that the multiplexed system signal arrives at the next repeater at a power level that enables ready detection and reamplification. The output of laser transmitter 23 is fed to coupler 26.

The local sensor element 17 of each repeater 11–14 is connected to the line interface unit 22 by conventional multiplexer electronics 28, which provides desired signal pre-processing to extract only selected signal content from the collected sensor input.

As noted earlier, in systems with close repeater spacing such as in the present example, there usually is ample power received at the input of each successive repeater to allow some of the incoming signal to be routed via a bypass link around the local repeater and carried to the next repeater. Therefore, in accordance with the invention, as seen in FIG. 2, an optical fiber bypass link consisting of a signal splitter 24, a bypass fiber 25 and a signal coupler 26 is connected in a parallel configuration completely around the local repeater. The bypass link may optionally contain an optical attenuator 27.

Coupler 26 combines the signal output denoted "a" of the bypass link, and the output of laser transmitter 23, denoted "b." The output of coupler 26 is a system signal, denoted "c" which is transmitted to the next repeater, and also a monitor signal, denoted "d" which is fed to monitor 30.

During normal operation, both the amplified signal "b" and the bypass signal "a" enter coupler 26. In order that the bypass signal "a" not interfere with the operation of the next regenerator, signal "a" must be at a power level maintained substantially below the signal strength of signal "b"—on the order of 3 dB, for example. Interference between "a" and "b" can occur if "a" is not substantially below "b", which will cause the next repeater during normal operation to be unable to recover the system signal.

One option to assure attenuation of signal "a" is to permanently set the split ratios in splitter 24 and coupler 26 to a fixed value to within a range of from 10% to 50%. A typical split setting is, for example, 50/50. This will provide a nominal attenuation of the bypass signal "a" of about 7 dB which will assure recovery of the system signal in the next regenerator. Other split ratios may be used (such as 60/40) depending on system requirements.

However, because of system variables a given set of splitter and coupler ratios may not always provide enough attenuation of the bypass signal to avoid causing malfunction of the next regenerator. Accordingly it is useful to serially include an attenuator 27 in the optical fiber bypass link, which advantageously is adjustable either in the field or at the factory. The extent of added attenuation required will depend on how much optical fiber cable is installed between given repeaters, and other factors.

Figure 3:
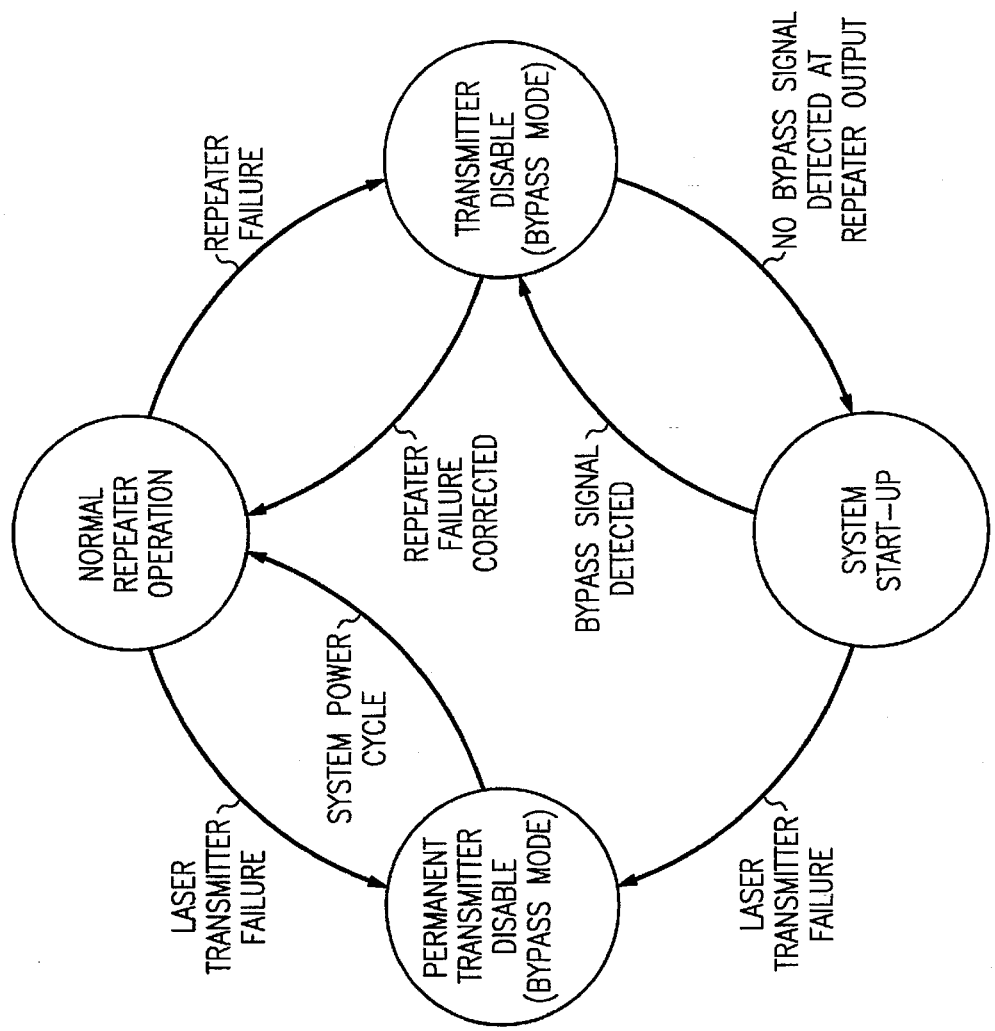
FIG. 3 is a state diagram portrayal of repeater operation as controlled by an internal monitor.

The fiber bypass of the present invention is intended to operate basically passively. However, certain control functions associated with the bypass link are active. While these functions are active, and while the repeater monitor requires DC power to operate, in the event of a complete power loss to a local repeater, laser transmitter 23 will automatically be turned off thereby enabling bypass 25 to propagate system transmissions around the disabled repeater and to the next unit. Specifically, the bypass repeater has four operating modes, as depicted in FIG. 3. The modes are:

normal repeater operation;
transmitter disable (bypass mode);
system start-up; and
permanent transmitter DISABLE (bypass mode).

These modes are determined by operation of repeater monitor 30, which detects conditions signifying various types of malfunctions that can occur in the local repeater. In its normal repeater operating mode, incoming data on fiber 15 to splitter 24 is recovered, baseband data acquired from local sensor 17 as processed by multiplexer 28 is multiplexer into the recovered data stream, and the data is re-transmitted. Monitor 30 recognizes normal operating conditions, in accordance with the logic diagram of FIG. 3. Specifically, monitor 30 obtains an indication over path 31 of the fiber system optical power received by optical receiver 20 from splitter 24. The indication might be derived, for example, by monitoring the photocurrent of the photo diode in receiver 20. Further, over path 32 monitor 30 obtains an indication of the output of clock recovery 21 to calculate whether the unit 21 is recovering a valid clock signal. Next, monitor 30 receives over path 36 a signal from the interface unit 22, which is used to indicate its proper operation (i.e., proper frame synchronization).

Still further, monitor 30 samples over path 34 the backface PIN photocurrent of the laser transmitter 23, to determine whether the laser transmitter 23 is putting out its rated power and whether it is operating correctly under feedback control. Also, over a path 35 from the associated power drop 7 seen in FIG. 1, monitor 30 detects a condition of low power supply voltage in the repeater.

Finally, repeater monitor 30 monitors the optical output power of the repeater over path 33. Monitoring the optical power level of "d" provides a determination of whether a laser transmitter failure has occurred or whether the repeater bypass signal is present.

The local repeater enters the transmitter DISABLE mode if monitor 30 detects any one or more of the following:

optical power received at receiver 20 dropping below a set sensitivity threshold;
line interface unit 22 not synchronizing to the incoming frame;
DC power supply voltage dropping below a threshold value of about 4.5 volts; or
incoming data transitions not being detected by clock recovery 21.

Disabling occurs by monitor 30 turning laser transmitter 23 OFF by a signal in path 37. This mode allows the bypass signal "a" coming from the next seaward repeater to be received at the next shoreward repeater. In this mode, the optical power at output coupler 26, measured by power of signal "d" is tracked and therefore indicates the presence of a bypass signal "a".

If the local repeater is in the transmitter DISABLE mode and the optical power at coupler 26 drops below a specified level, indicating loss of the bypass signal "a", monitor 30 switches the repeater into system start-up mode. In this mode, the local repeater generates and transmits a system startup frame using a local clock source in the clock recovery unit 21. By providing system start-up, this mode allows the remaining shoreward repeaters to operate in the event of a serious system failure such as a cut in the system cable.

The fourth mode, permanent transmitter DISABLE mode, is entered either from system start-up mode or from the normal repeat operation mode, when the local transmitter output drops below a specified level as measured by the power of signal "d" from coupler 26 or via path 34 from laser transmitter 23. This mode operates on the assumption that the laser transmitter is degraded and that permanent transmitter DISABLE is the only viable operating mode. System signal energy will be muted around the failed repeater via the bypass link to the next shoreward repeater. To exit this mode, the repeater power is cycled off and on.

We claim:

1. A data transmission system that comprises an optical fiber transmission line and at least first and second repeaters that receive incoming optical information signals from the transmission line, wherein the second repeater is situated downstream of the first repeater with respect to a data stream in the transmission line, the second repeater includes means for collecting data from a sensor and injecting said data into said data stream, and each of the first and second repeaters comprises means for generating and amplifying electrical information signals in response to said incoming signals, generating outgoing optical signals in response to said electrical information signals, and injecting said outgoing signals into the transmission line, the first repeater comprising:

a) a receiver for generating and amplifying the electrical information signals;

b) a clock recovery unit for receiving the electrical information signals from the receiver and re-timing digital data within said signals, said unit comprising a local clock source for generating, on demand, a system startup frame that will enable the second repeater to continue to operate in the event that there is a fault in the transmission line upstream of the first repeater;, c) a laser transmitter for receiving said signals after they have been processed by the clock recovery unit, and for generating the outgoing optical signals;

d) a bypass line for directing a portion of the incoming optical signals into the transmission line as outgoing optical signals without conversion of said portion to electrical signals;

e) a power supply electrically connected to the receiver, clock recovery unit, and transmitter;

f) a monitor distinct from, and electrically connected to the power supply, receiver, clock recovery unit, and transmitter; and g) passive optical coupling means for receiving outgoing optical signals from the laser transmitter and the bypass line, coupling a portion of said outgoing optical signals into the transmission line, and diverting a portion of said outgoing optical signals directly into the monitor, wherein:

h) the monitor includes control means for making transitions from one to another of respective internal states selected from a plurality of states, said plurality including a NORMAL state, a DISABLE state, and a STARTUP state;

i) the first repeater includes means for turning off the laser transmitter when the DISABLE state is entered;

j) the control means are adapted to make a transition from the NORMAL state to the DISABLE state when the monitor receives a faulty diagnostic signal from the receiver, the clock recovery unit, or the power supply;

k) the control means are further adapted to make a transition from the DISABLE state to the STARTUP state when the optical input to the monitor from the passive optical coupling means drops below a threshold; and l) means, activated when the STARTUP state is entered, for causing the clock recovery unit to generate a system start-up frame using the local clock source, and for transmitting said start-up frame, whereby at least the second repeater is allowed to operate.

2. The system of claim 1, wherein: the plurality of internal states further includes a PERMANENT DISABLE state;

the first repeater includes means for turning off the laser transmitter when the PERMANENT DISABLE state is entered;

the control means are adapted to make a transition from the NORMAL state or the STARTUP state to the PERMANENT DISABLE state when the monitor receives a faulty diagnostic signal from the laser transmitter;

the power supply is adapted for cycling power to the first repeater, and the first repeater further comprises means for cycling the first repeater power off and on during the PERMANENT DISABLE state, and for returning to the NORMAL state after said power cycling.

3. The system of claim 2, wherein the first repeater further comprises:

a line interface unit electrically connected between the clock recovery unit and the laser transmitter;

a local sensor for generating an electrical local data signal; and a local multiplex unit for receiving said local data signal and multiplexing it into the electrical information signals via the line interface unit.

4. The system of claim 3, wherein the control means are further adapted to make a transition from the NORMAL state to the DISABLE state when a faulty diagnostic signal is received from the line interface unit.

* * * * *